Aug. 1, 1933.   J. FLEACA   1,920,687
ELECTRICALLY DRIVEN CRADLE
Filed July 5, 1932   2 Sheets-Sheet 1
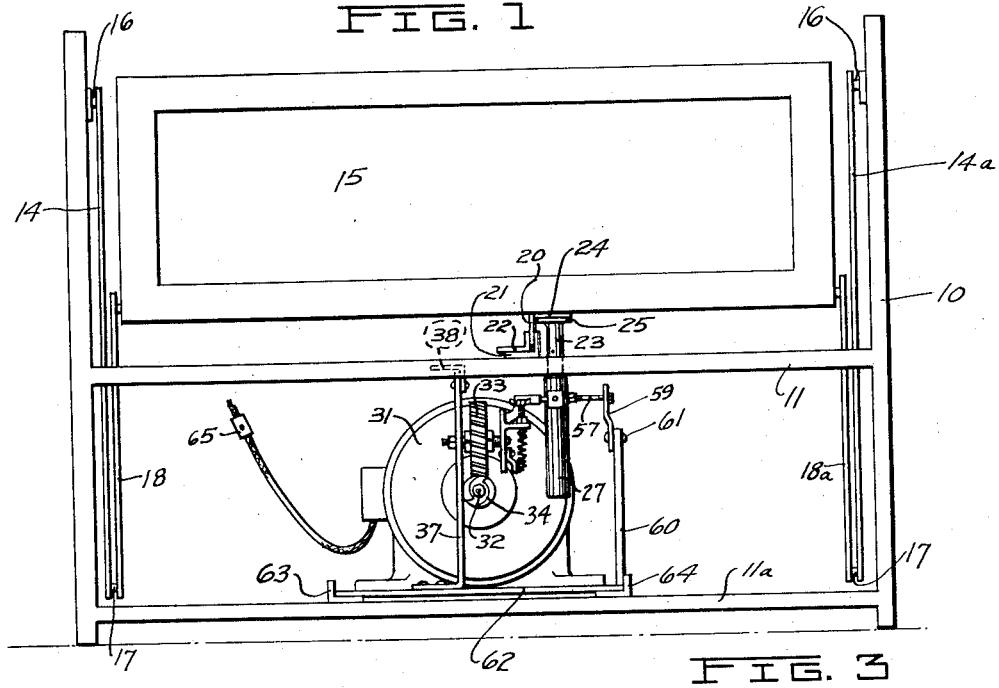
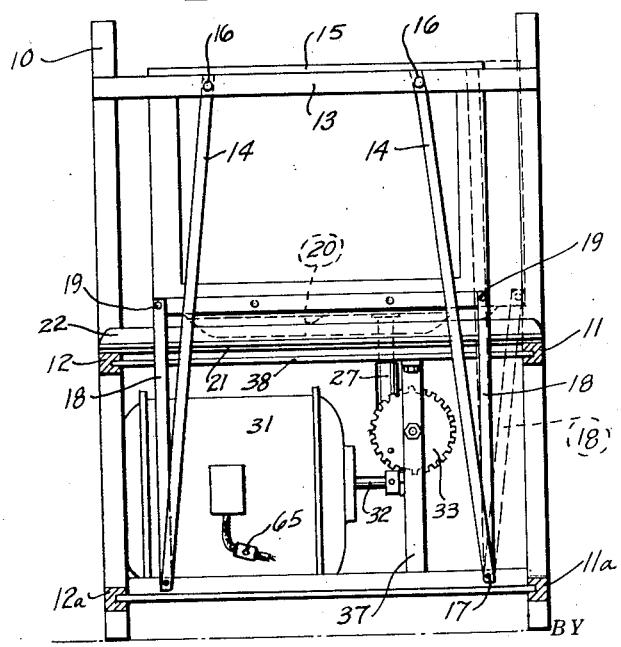
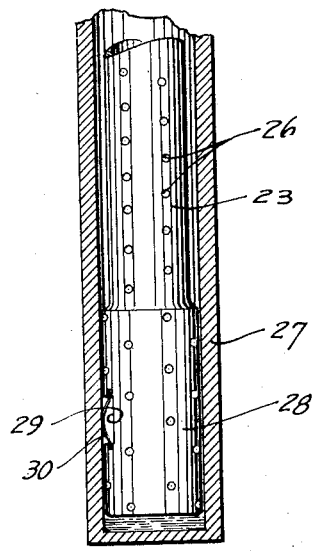
INVENTOR
JOHN FLEACA
BY John A. Bommhardt
ATTORNEY Aug. 1, 1933.   J. FLEACA   1,920,687
ELECTRICALLY DRIVEN CRADLE
Filed July 5, 1932   2 Sheets-Sheet 2
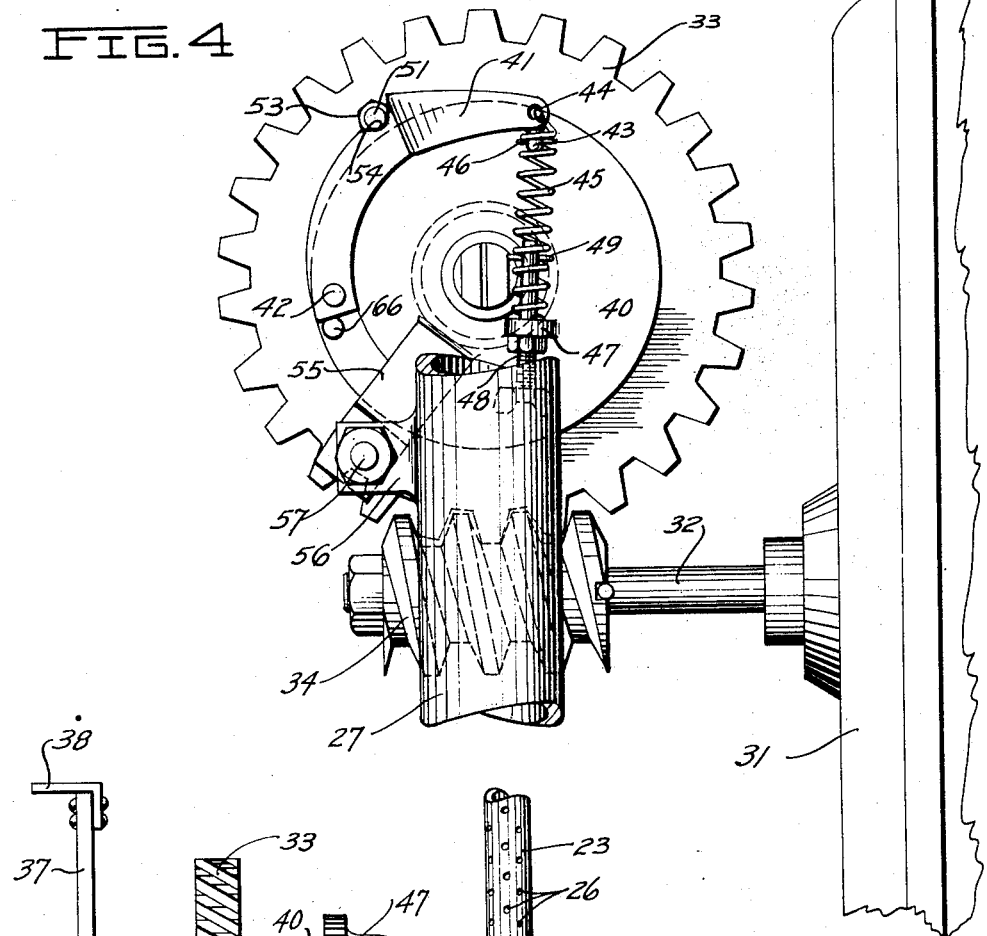
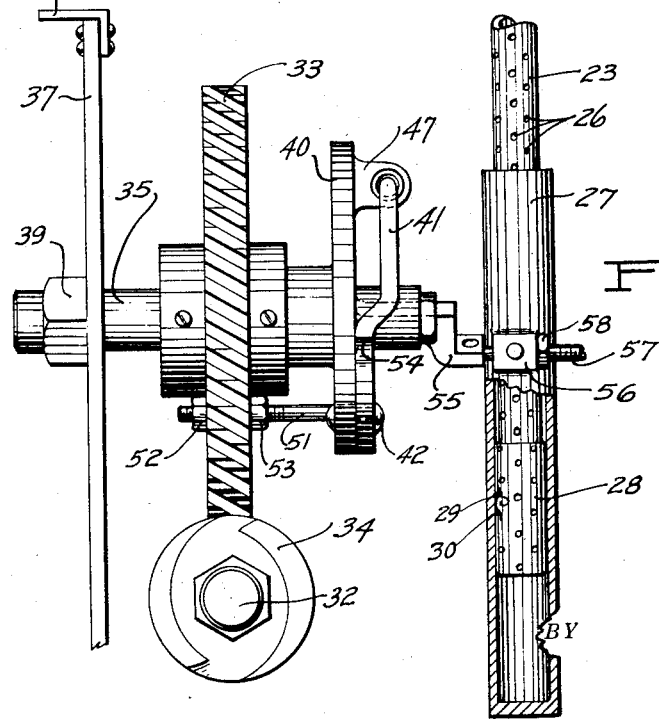
INVENTOR
JOHN FLEACA
BY John A. Bennerhardt
ATTORNEY Patented Aug. 1, 1933

1,920,687

UNITED STATES PATENT OFFICE 1,920,687

ELECTRICALLY DRIVEN CRADLE

John Fleaca, Cleveland, Ohio

Application July 5, 1932. Serial No. 620,840

3 Claims. (Cl. 74—14)

This invention relates to cradle rocking or swinging devices and more particularly to electrically driven cradles.

One object of the invention is to provide means whereby a cradle may be mechanically rocked and require no attendant.

Another object is to provide a simple and inexpensive structure.

Other advantages may be noted from the following specification and its accompanying illustrations, in which:—

Figure 1 is a side elevation of the cradle and rocking mechanism; Fig. 2 is an end view of Fig. 1 with end posts of the frame cut away; Fig. 3 is an enlarged section of the lower part of the cylinder and piston; Fig. 4 is an enlarged front view of the operating mechanism with the cam lever engaged; Fig. 5 is a side elevation of the operating mechanism with the cam lever disengaged.

Referring to the drawings: A frame is indicated at 10 with side bars 11, 11a, 12 and 12a and end bars 13. A pair of long swinging arms 14 and 14a at each end of the cradle 15 are attached at upper pivot points 16 to bars 13, their lower ends being pivotally attached at 17 to short swinging arms 18 and 18a, and said short swinging arms are attached at their upper ends to the lower cradle ends at pivot points 19.

An angular plate 20 mounted on the under side of cradle 15 is curved at the ends and moves or rocks between the angular guides 21 and 22 respectively which are mounted at each end on the side bars 11 and 12.

A hollow piston 23 has a flanged head 24 mounted on the underside of cradle 15 below the flange 25 of the angular plate 20. Said hollow piston is perforated with a plurality of oil apertures 26 which permit a constant lubrication of the piston 23 as it moves within a cylinder 27, and an enlarged base portion 28 of the piston 23 is slotted at 29, said slot having a tension spring 30 mounted therein to prevent any side motion of the piston 23 within the cylinder 27.

A motor 31 with shaft 32 drives gear 33 by means of a worm 34 mounted on said shaft 32. The gear 33 is mounted on a shaft 35 supported by a bolt 36 mounted through a brace bar 37 attached to an angular cross bar 38 mounted within side bars 11 and 12, said bolt 36 being held in position by a nut 39.

A plate 40 is loosely mounted on shaft 35 adjacent to the gear 33, said plate having a clutch or cam lever 41 pivotally attached at 42 whose opposite end has a boss 43 projecting outwardly therefrom. An aperture 44 in the free end of the cam lever 41 has a spring 45 attached thereto which encircles the boss 43 and is supported thereon by a pin 46 through the said boss. The spring 45 projects downwardly and is attached at its opposite end to a lug 47 projecting from the plate 40. An adjusting bolt 48 is screwed through the lug 47 and projects upwardly within the coils of the spring 45 and is anchored within the coils by a pin 49 and a lock nut 50 locks the bolt 48 in position for retaining the correct tension.

A stop pin 51 mounted through the gear 33 with lock nuts 52 and 53 catches in the notch 54 of the cam lever 41 as said cam lever moves with the action of the spring 45, the plate 40 being driven by the pin 51 engaging in said notch 54.

A crank 55 mounted on plate 40 is attached to a cylinder lug 56 by a bolt 57 journaled within the end of said crank 55 and is locked in position by a nut 58. The bolt 57 projects through a pivot arm 59 mounted on brace 60 by a pivot 61, brace 60 being rigidly supported on the motor base 62 mounted on flanged cross bars 63 and 64.

In operation a switch 65 controls the motor 31 which drives the gears 33 and 34 and causes the plate 40 to revolve; the attached crank 55 being anchored to said plate 40 at one end and to the pivot arm 59 at the opposite end by means of the bolt 57 causes the cylinder 27 to move up and down on the piston 23 with the action of said crank 55 thus producing movement of the angular plate 20 between the angular guides 21 and 22. The angular plate being attached to the cradle 15 swings the said cradle as it hangs suspended from the pivoting rocking arms 14, 14a, 18 and 18a.

When the cradle 15 is hit or the motion stopped by any other means than by snapping the switch off, the pin 51 moves out of the notch 54 without stopping or harming the motor.

The parts 26 and 27 act as a sort of dash pot to produce and limit the movement.

A stop pin 66 mounted in plate 40 adjacent the cam lever 41 prevents said cam lever from pivoting above the point of contact with stop pin 51 mounted through the gear 33.

I claim:

1. The combination of a gear and its shaft, a crank plate on the shaft, and power transmitting devices operated by the crank plate, said devices including a cylinder carried by the crank plate and a piston working in the cylinder.

2. The combination stated in claim 1, the piston being hollow and perforated for the purpose stated.

3. A driving mechanism comprising a shaft having a crank plate thereon, a cylinder connected to and movable around with the crank plate, and a piston working in the cylinder and connected to a member to be driven.

JOHN FLEACA.